United States Patent [19]

Maruyama et al.

[11] Patent Number: 4,567,221

[45] Date of Patent: Jan. 28, 1986

[54] WATER RESISTANT COMPOSITIONS

[75] Inventors: Hitoshi Maruyama; Taku Tanaka, both of Kurashiki; Takuji Okaya, Nagaokakyo, all of Japan

[73] Assignee: Kuraray Co., Ltd., Kurashiki, Japan

[21] Appl. No.: 587,564

[22] Filed: Mar. 8, 1984

[30] Foreign Application Priority Data

Mar. 31, 1983 [JP] Japan ................................ 58-56902
Mar. 31, 1983 [JP] Japan ................................ 58-56907

[51] Int. Cl.$^4$ .............................................. C08L 3/22
[52] U.S. Cl. ................................... 524/436; 524/437; 524/493; 524/547; 525/60; 525/61
[58] Field of Search ............... 524/493, 547, 436, 437; 525/60, 61

[56] References Cited

U.S. PATENT DOCUMENTS

| | | | |
|---|---|---|---|
| 3,408,420 | 10/1968 | Wiggill | 525/102 |
| 3,959,242 | 5/1976 | Watts et al. | 525/61 |
| 4,016,129 | 4/1977 | Miyosawa | 524/557 |
| 4,097,436 | 6/1978 | Buning et al. | 525/60 |
| 4,219,591 | 8/1980 | Buning et al. | 525/60 |
| 4,276,389 | 6/1981 | Wieder et al. | 525/61 |

FOREIGN PATENT DOCUMENTS

| | | | |
|---|---|---|---|
| 55-099987 | 7/1980 | Japan . | |
| 57-073059 | 5/1982 | Japan . | |
| 0079003 | 5/1983 | Japan | 525/60 |
| 0164604 | 9/1983 | Japan | 525/60 |

OTHER PUBLICATIONS

Copending application (Ser. No. 06/429321).

*Primary Examiner*—Paul R. Michl
*Assistant Examiner*—J. M. Reddick
*Attorney, Agent, or Firm*—Oblon, Fisher, Spivak, McClelland & Maier

[57] ABSTRACT

Water-resistant compositions which comprise a modified polyvinyl alcohol having a silyl group in the molecule and an organic substance, useful as compositions for treating inorganic materials and defogging compositions.

8 Claims, No Drawings

WATER RESISTANT COMPOSITIONS

BACKGROUND OF THE INVENTION

1. Field of the Invention

This invention relates to water resistant compositions, especially suitable as compositions for treating inorganic materials and defogging compositions.

2. Description of the Prior Art

Heretofore, polyvinyl alcohol (hereinafter referred to as PVA) has been widely employed as various binders, adhesives or surface treating sizing agents and is known to possess excellent performance in film forming properties and strength far superior to any other sizing agent. However, since PVA is water soluble, it has a disadvantage that its water resistance is poor, and therefore various methods have heretofore been studied for the purpose of improving it, but up until the present time no satisfactory method had yet been obtained.

For example, Japanese Patent Application Laid-open No. 123189/1975 (U.S. Pat. No. 4,219,591) describes that a modified PVA having a silyl group in the molecule, is effective as a coating agent for inorganic silicate substrates such as glass etc. However, as can be understood from the comparative example described hereinafter the modified PVA alone cannot impart adequate water resistance.

Transparent materials such as plastic materials, inorganic glass etc. are in general widely utilized as window glass for buildings, vehicles, aircrafts etc., mirrors, spectacle lenses, goggles, agricultural films, food wrapping films etc. These transparent materials have the disadvantage that under highly humid conditions or at a temperature below the dew point, atmospheric moisture condenses on the surface, thereby fogging the surface. In the case of a plastic material, there is the disadvantage that the surface easily gets scratched and tends to bring about a reduction in transparency.

Various attempts for preventing such a phenomenon and imparting defogging properties and scratch resistance to the surface of transparent materials have heretofore been proposed. For example, in order to improve the water wetting properties of the surface of transparent materials, a method which comprises coating a surface active agent such as glycerin, polyalkylene glycol, cellulose derivative, polyvinyl alcohol, polyhydroxyalkyl acrylate, polyethyleneimine or the like has been proposed. This method, although being able to temporarily impart defogging properties, had the disadvantage that the defogging properties were reduced with time, due to leakage of the defogging agent, to the fact that the scratch resistance was not enough, and so forth. Japanese Patent Application Laid-open Nos. 39347/1978, 99987/1980, 73059/1982 etc. discloses methods for forming a defogging film which comprise using a composition mainly comprising either a hydrophilic polymer such as PVA etc. and silica, or these two further combined with a lower molecular weight organic silicon compound. However, the defogging films formed by these methods have the disadvantage that upon water absorption the surface hardness was low and easily bringing about scratches by, e.g., nails, and thus being far from practical.

SUMMARY OF THE INVENTION

The present inventors have discovered that a composition which comprises a modified PVA containing a silyl group in the molecule and an inorganic substance has excellent water resistance, in particular for treating inorganic materials having accomplished this invention.

The present inventors, as the result of the intensive study on defogging compositions eliminating the above-described disadvantages of the conventional defogging compositions and having long-lasting defogging properties, enough water resistance (e.g. surface hardness) when water absorbed and excellent scratch resistance, have come to discovered that a defogging composition which comprises a modified PVA having a silyl group in the molecule and an inorganic substance not only possesses excellent characteristics for retaining defogging properties, but have also found that this composition has a remarkably high water resistance (e.g. surface hardness) when water absorbed thereof as compared with the conventional defogging agents and it also has excellent scratch resistance.

This invention is more particularly described hereinbelow.

DETAILED DESCRIPTION OF PREFERRED EMBODIMENTS

While the modified PVA containing a silyl group in the molecule used in this invention may be any PVA containing silicon in the molecule, in particular, said modified PVA containing a silyl group in the molecule is preferably a modified PVA having a silyl group of formula (I) in the molecule:

wherein m=0–2, p=1–3 with the proviso that m+p≦3, M is a hydrogen atom or an alkali metal, $R^1$ is an alkyl group of 1–5 carbon atoms, and $R^2$ is an alkoxyl group or acyloxyl group of 1–40 carbon atoms, wherein the alkoxyl group or acyloxyl group may optionally have a substituent containing oxygen.

Examples of the process for the production of such modified PVA include (1) a process which comprises introducing a silyl group into PVA or a modified polyvinyl acetate containing a carboxyl group or a hydroxyl group by post-modification using a silylating agent, (2) a process which comprises saponifying a copolymer of a vinyl ester and a silyl group-containing olefinically unsaturated monomer, (3) a process which comprises saponifying a polyvinyl ester having a silyl group at a terminal obtained by polymerizing a vinyl ester in the presence of a mercaptan having a silyl group. In the process which comprises post-modifying PVA or a modified polyvinyl acetate using a silylating agent, a silyl group-containing modified PVA may be obtained by dissolving a silylating agent in an organic solvent which does not react with the silylating agent, for example, benzene, toluene, xylene, hexane, heptane, ether, acetone etc., suspending a PVA powder or a powder of the aforesaid modified polyvinyl acetate in said solution with stirring, and reacting the silylating agent with PVA or the aforesaid modified polyvinyl acetate at a temperature ranging from normal temperature to the boiling temperature of the silylating agent, or further saponifying the vinyl acetate units with an alkali catalyst etc. Examples of the silylating agent used in the post-modification include organohalogenosilanes such as trimethylchlorosilane, dimethyldichlorosilane, methyltrichlorosilane, vinyltrichlorosilane, diphenyldichlorosilane, triethylfluorosilane etc., organosilicone esters such as trimethylacetoxysilane, dimethyldiacetoxysilane etc., organoalkoxysilanes such as trimethylmethoxysilane, dimethyldimethoxysilane etc., organosilanols such as trimethylsilanol, diethylsilanediol etc., aminoalkylsilanes such as N-aminoethylaminopropyltrimethoxysilane etc., organosilicon isocyanates such as trimethylsilicon isocyanate etc., and the like. The rate of the silylating agent introduced, that is, the degree of modification may be freely adjusted by the amount of the silylating agent and the reaction time. The degree of polymerization and the degree of saponification of the obtained silyl group-containing modified PVA may be controlled by the degree of polymerization and degree of saponification of PVA used or the degree of polymerization and saponification reaction of the aforesaid modified polyvinyl acetate.

Further, in the process which comprises saponifying a copolymer of a vinyl ester and a silyl group-containing olefinically unsaturated monomer, a silyl group-containing modified PVA may be obtained, for example, by copolymerizing a vinyl ester and a silyl group-containing olefinically unsaturated monomer in alcohol using a radical initiator and thereafter by adding an alkali or acid catalyst to an alcoholic solution of said copolymer to saponify said copolymer. Examples of the vinyl ester used in the above-described process include vinyl acetate, vinyl propionate, vinyl formate etc., vinyl acetate being preferred in an economical point of view. Examples of the silyl group-containing olefinically unsaturated monomer used in the above-described process include vinylsilanes of the following formula (II) and (meth)acrylamidoalkylsilanes of the following formula (III):

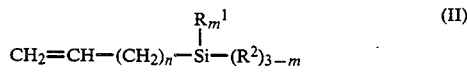

(II)

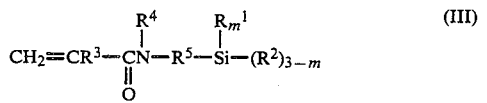

(III)

wherein n is 0–4, m is 0–2, $R^1$ is an alkyl group of 1–5 carbon atoms (methyl, ethyl etc.), $R^2$ is an alkoxyl group or acyloxyl group of 1–40 carbon atoms, wherein the alkoxyl group or acyloxyl group may optionally have a substituent containing oxygen, $R^3$ is a hydrogen atom or a methyl group, $R^4$ is a hydrogen atom or an alkyl group of 1–5 carbon atoms, $R^5$ is an alkylene group of 1–5 carbon atoms or a divalent organic residue in which the carbon atoms in the chain are connected with each other via oxygen or nitrogen, with the proviso that where two groups represented by $R^1$ are present in the same monomer, said $R^1$ groups may be the same or different, and also where two or more groups represented by $R^2$ are present in the same monomer, such $R^2$ groups may be the same or different.

Specific examples of the vinylsilanes of the formula (II) include vinyltrimethoxysilane, vinyltriethoxysilane, vinyltris($\beta$-methoxyethoxy)silane, vinyltriacetoxysilane, allyltrimethoxysilane, allyltriacetoxysilane, vinylmethyldimethoxysilane, vinyldimethylmethoxysilane, vinylmethyldiethoxysilane, vinyldimethylethoxysilane, vinylmethyldiacetoxysilane, vinyldimethylacetoxysilane, vinylisobutyldimethoxysilane, vinyltriisopropoxysilane, vinyltributoxysilane, vinyltrihexyloxysilane, vinylmethoxydihexyloxysilane, vinyldimethoxyoctyloxysilane, vinylmethoxydioctyloxysilane, vinyltrioctyloxysilane, vinylmethoxydilauryloxysilane, vinyldimethoxylauryloxysilane, vinylmethoxydioleyloxysilane, vinyldimethoxyoleyloxysilane, further polyethylene glycolated vinylsilanes of the general formula:

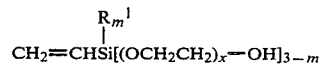

wherein $R^1$ and m are as defined above and x is 1–20, and so forth. Specific examples of the (meth)acrylamido-alkylsilanes of the formula (III) include 3-(meth)acrylamido-propyltrimethoxysilane, 3-(meth)acylamido-propyltriethoxysilane, 3-(meth)acrylamido-propyltri($\beta$-methoxyethoxy)silane, 2-(meth)acrylamido-2-methylpropyltrimethoxysilane, 2-(meth)acrylamido-2-methylethyltrimethoxysilane, N-(2-(meth)acrylamido-ethyl)aminopropyltrimethoxysilane, 3-(meth)acrylamido-propyltriacetoxysilane, 2-(meth)acrylamido-ethyltrimethoxysilane, 1-(meth)acrylamido-methyltrimethoxysilane, 3-(meth)acrylamidopropylmethyldimethoxysilane, 3-(meth)acrylamido-propyldimethylmethoxysilane, 3-(N-methyl-(meth)acrylamido)-propyltrimethoxysilane, 3-((meth)acrylamido-methoxy)-3-hydroxypropyltrimethoxysilane, 3-((meth)acrylamido-methoxy)-propyltrimethoxysilane, dimethyl-[3-(meth)acrylamido-propyl]-[3-(trimethoxysilyl)-propyl]-ammonium chloride, dimethyl-[2-(meth)acrylamido-2-methylpropyl]-[3-(trimethoxysilyl)propyl]ammonium chloride and so forth.

Further, in the production of the modified PVA used in this invention, on carrying out the copolymerization of the vinyl ester and the silyl group-containing olefinically unsaturated monomer, it is also possible to use, in addition to said two components, a small proportion of other unsaturated monomer copolymerizable with such monomer components, for example, styrene, alkyl vinyl ethers, vinyl versatate, olefins such as ethylene, propylene, $\alpha$-hexene, $\alpha$-octene etc., unsaturated acids such as (meth)acrylic acid, crotonic acid, (anhydrous) maleic acid, fumaric acid, itaconic acid etc. and alkyl esters and alkali salts thereof, sulfonic acid-containing monomers such as 2-acrylamido-2-methylpropanesulfonic acid etc. and alkali salts thereof, cationic monomers such as trimethyl-2-(1-(meth)acrylamido-1,1-dimethylethyl)ammonium chloride, trimethyl-3-(1-(meth)acrylamidopropyl)ammonium chloride, 1-vinyl-2-methylimidazole and their primary to quaternary salts and so forth.

In the process which comprises saponifying a polyvinyl ester containing a silyl group at a terminal obtained by polymerizing a vinyl ester in the presence of a mercaptan having a silyl group, a modified PVA having a silyl group may be obtained by adding, on, for example, polymerizing the vinyl ester using a radical initiator, a mercaptan having a silyl group to the polymerization system either in one portion or dividedly or continuously to make the silyl group-containing mercaptan present in the polymerization system thereby forming a polyvinyl ester having a silyl group at a terminal by the chain transfer to the mercaptan, and thereafter adding an alkali or acid catalyst to an alcoholic solution of said polyvinyl ester to saponify said polyvinyl ester.

As the silyl group-containing mercaptan used in the present process, 3-(trimethoxysilyl)-propylmercaptan, 3-(triethoxysilyl)-propylmercaptan etc. may be employed. On producing the modified PVA by the present process, it is also possible to add a small proportion of an unsaturated monomer copolymerizable with the vinyl ester used in the process (2).

In the above-described three processes for the production of a modified PVA containing a silyl group in the molecule, the process which comprises saponifying a copolymer of a vinyl ester and an olefinically unsaturated monomer containing a silyl group and the process which comprises saponifying a polyvinyl ester containing a silyl group at a terminal obtained by polymerizing a vinyl ester in the presence of a mercaptan having a silyl group are preferably employed in view of the easiness of a commercial production and the homogeneity of the modified PVA obtained.

The content of the silyl groups and the degree of saponification or degree of polymerization in the silyl group-containing modified PVA used in this invention may be appropriately selected according to the purpose and are not particularly restricted. The silyl group can manifest an effect even with a content of a relatively small amount and, in general, the content is selected from the range of 0.01–10 molar %, preferably 0.1–2.5 molar %, calculated as the silyl group-containing monomer units. The degree of saponification is generally preferably in the range of 70–100 molar %. The degree of polymerization is generally selected from the range of 10–3000.

On dissolving the aforesaid modified PVA used in this invention in water, a uniform aqueous solution may be obtained usually by dispersing the modified PVA in water, adding an alkali such as sodium hydroxide etc. as needed and heating with stirring.

Examples of the inorganic substance used in this invention include those containing an element such as aluminum, silicon, magnesium, calcium etc., among which those containing an aluminum or silicon element are preferably used. Specific examples of the inorganic substance containing the aforesaid elements include water soluble alkaline inorganic compounds such as sodium silicate, sodium aluminate, calcium hydroxide etc., water soluble acidic inorganic compounds such as aluminum sulfate, magnesium chloride etc., water insoluble inorganic compounds either acidic or having alkali ion exchange ability such as silicon dioxide, sand, clay, talc etc., and water insoluble alkaline inorganic compounds such as calcium silicate, aluminum oxide, calcium carbonate etc., among which sodium silicate, aluminum sulfate, aluminum oxide etc. are preferably used.

Where the aforesaid inorganic substance is a water soluble inorganic compound, although it has a disadvantage that the viscosity of the aqueous solution of the modified PVA tends to increase if used in a large amount, it has a feature that even by use of a small amount, the effect to enhance the water resistance of the obtained composition is relatively high. On the other hand, in the case of a water insoluble inorganic compound, although the effect to enhance the water resistance of the composition is relatively small when used in a small amount, it has a feature that the water resistance of the composition becomes highest when the proportion of the amount used is high. Therefore, it is preferred to appropriately select the inorganic substance to be used according to the use purpose and use method of the composition of this invention. Where a water insoluble inorganic substance is used as the inorganic substance, the particle diameter of the inorganic substance particles is not particularly restricted and those of various diameters may be employed depending on the use, but where the use requires transparency or surface smoothness, that of a smaller particle diameter is generally preferred and usually 0.05–200 m$\mu$ is used, whereas, for other purposes, that having a larger particle diameter is preferred.

The mixing ratio by weight of the modified PVA containing a silyl group in the molecule to the inorganic substance in the composition of this invention may be in the range of 5/95–99/1; it is preferably 50/50–99/1 and more preferably 60/40–95/5 where the inorganic substance is a water soluble compound or it is preferably 20/80–80/20 and more preferably 40/60–70/30 where the inorganic substance is a water insoluble compound. If the mixing proportion of the latter is smaller than the above-described range, the water resistance is not adequate, whereas if too large, the strength of the composition is reduced.

While the composition of this invention has an essential requirement that it must contain the modified PVA having a silyl group in the molecule and the inorganic substance as described above, it will be appreciated that it can also contain, in addition thereto, e.g. solvents, various additives, other water soluble resins, polymeric aqueous dispersions etc. depending on the use. While water is preferably used as the solvent, it is possible to use in combination therewith such solvents as various alcohols, ketones, dimethylformamide, dimethylsulfoxide etc.; examples of the additives include various defoaming agents, various dispersing agents, nonionic or anionic surface active agents, silane coupling agents, pH adjusting agents etc., and examples of the water soluble resins include cellulose derivatives such as carboxymethyl cellulose, hydroxyethyl cellulose etc., (meth)acrylic polymers such as poly(meth)acrylic acid, polyhydroxy(meth)acrylate or copolymers thereof, polyacrylamide etc., polyvinylpyrrolidone and copolymers thereof, PVA derivatives such as carboxyl group-containing modified PVA, sulfuric acid group-containing modified PVA, sulfonic acid group-containing modified PVA, phosphoric acid group-containing modified PVA, quaternary ammonium salt group-containing modified PVA, amino group-containing modified PVA, general PVA etc. ahd the like. Further, examples of the polymeric aqueous dispersions include aqueous dispersions of acrylic polymers and copolymers, ethylene-vinyl acetate copolymers, vinyl ester type polymers and copolymers, styrene-butadiene copolymers etc.

The compositions of this invention are used as aqueous solutions or aqueous dispersions by dissolving or dispersing in water or water containing the aforesaid organic solvents.

The compositions of this invention have reactivity to inorganic materials owing to the modified PVA having a silyl group, and by efficiently utilizing this performance coupled with film forming properties, film strength or water resistance, they are effectively used as adhesives or binders for inorganic materials or organic materials, paint vehicles, treating agents for inorganic materials or organic materials, e.g. surface coating agents, and further may be used in applications where the conventional water soluble resins have been used, e.g. films, sheets etc. Since the compositions of this invention have strong reactivity with inorganic materials, they also exhibit excellent adhesion to inorganic materials and also exhibit excellent water resistance and hence are extremely useful as treating agents for inorganic materials.

The following description is given as an example only and is not intended to restrict this invention. When an aqueous solution or aqueous dispersion of the composition of this invention is coated on the surface of an inorganic material such as cement, mortar etc. and dried, water resistance may be imparted to the cement, mortar etc., and therefore this is useful as a waterproofing surface treating agent for cement, mortar etc. Further, by spraying it over the soil surface and drying, it can provide the soil surface with a waterproof and water resistant film and therefore it is useful as a waterproofing treating agent for reservoir earth dams, a dusting inhibitor for agricultural soil particles, an agent for preventing uncovered slope soil from surface destruction (surface layer protecting agent) etc. Further, when used as a formulating component for cement, mortar etc., it can prevent the separation of water or water soluble components such as calcium hydroxide etc. from the cement, mortar etc. and can enhance the surface strength of the cement, mortar etc. Still further, it is useful as a soil quality improver, a horticultural soil binder etc., and by injecting or mixing an aqueous solution or aqueous dispersion of the composition of this invention into soil, sand etc., it can convert the latter into consolidated lumps or solids having water resistance. In addition, it may be used as a binder for inorganic fibers, a ceramics binder etc.

Where the composition of this invention is used as a treating agent for inorganic materials described above, if the inorganic material is an alkaline material such as cement, mortar etc., it is preferred that the inorganic substance in the composition of this invention be an acidic inorganic compound, whereas if the inorganic material is an acidic material such as soil etc., then it is preferred that the inorganic substance in the composition of this invention be an alkaline inorganic compound.

Although the reasons why the compositions of this invention are excellent in film forming properties, film strength and water resistance have not yet been fully understood, it is presumed that the film forming properties are manifested by the vinyl ester units or the vinyl alcohol units in the modified PVA having a silyl group in the molecule used in the composition of this invention and at the same time since the silyl group to which the alkoxyl group or the acyloxyl group is attached or the silanol group which is a hydrolysate of the above or the salt group thereof has high reactivity with the inorganic substance or the hydroxyl group or the silanol group or the salt group thereof in the modified PVA and hence they react with each other to form a firm film, high film strength and water resistance are manifested.

The composition of this invention is more particularly described in relation to a case where it is used as a defogging composition.

While the modified PVA having a silyl group in the molecule to be used may be that selected from the above examples, a defogging composition having even better water wetting properties can sometimes be obtained by employing a modified PVA containing PVA having a silyl group in the molecule which contains 0.2-10 molar %, preferably 0.5-5 molar %, of ionic hydrophilic group units. Examples of the olefinically unsaturated monomer having an ionic hydrophilic group include olefinically unsaturated monomers having carboxyl group or a salt thereof, a sulfonic acid group or a salt thereof, an amino group, an ammonium group etc., and, in addition, olefinically unsaturated monomers having such alkyl ester, amide or imide of the above-described ionic hydrophilic group as can produce said ionic hydrophilic group on saponofication of the copolymer are also included in the category of the olefinically unsaturated monomer having an ionic hydrophilic group used in this invention. Specifically, there may be employed (meth)acrylic acid, maleic anhydride, itaconic acid, salts or mono- or di-alkyl esters thereof, vinylsulfonic acid, allylsulfonic acid, 3-(meth)acrylamido-propylsulfonic acid, 2-(meth)acrylamido-2,2-dimethylethylsulfonic acid, salts or alkyl esters thereof, vinylamine and vinylsuccinylimide, butyl N-vinylcarbamate, methyl N-vinylcarbamate and the like vinyl amine derivatives, N-vinylimidazole, 2-methyl-N-vinylimidazole, dimethyl-3-(meth)acrylamido-propylamine, dimethyl-2-(meth)acrylamido-2,2-dimethylethylamine, their primary to quaternary ammonium salt derivatives, etc.

As the inorganic substance, that in the form of finely divided particles, especially colloidal silica, is the best in view of the transparency and the water resistance (e.g. surface hardness when water absorbed) of the resulting film. Where the particle diameter exceeds 200 m$\mu$, the transparency of the resulting film tends to be poor, and thus this is not preferred.

In the defogging composition of this invention, the mixing ratio of the modified PVA having a silyl group in the molecule to the inorganic substance is 5/95-99/1, more preferably 20/80-80/20. If the mixing proportion of the latter is less than 1, then the water resistance (e.g. surface hardness when water absorbed) is low, whereas if it exceeds 95, the adhesion to transparent materials and scratch resistance when dry of the resulting film are reduced.

The defogging composition of this invention has an essential requirement that it must contain, as described above, the modified PVA having a silyl group in the molecule and the inorganic substance, especially that of finely divided particles having a particle diameter of not greater than 200 m$\mu$, but it is also possible to add, in addition thereto, solvents, various additives etc. according to the use.

While water is preferably used as the solvent, it is possible to use in combination therewith such solvents as various alcohols, ketones, dimethylformamide, dimethylsulfoxide etc.

As the additives, there may be added various defogging agents, nonionic or anionic surface active agents, cellulose derivatives such as carboxymethyl cellulose, hydroxyethyl cellulose etc., (meth)acrylic polymers such as poly(meth)acrylic acid, polyhydroxy(meth)acrylate or copolymers thereof, polyacrylamide etc., polyvinylpyrrolidone or copolymers thereof, PVA derivatives such as carboxyl group-containing modified PVA, sulfuric acid group-containing modified PVA, sulfonic acid group-containing modified PVA, phosphoric acid group-containing modified PVA, quaternary ammonium salt group-containing modified PVA, amine group-containing modified PVA, general PVA etc., aqueous dispersions of e.g. acrylic polymers and copolymers, ethylene-vinyl acetate copolymers, vinyl ester type polymers and copolymers, styrene-butadiene copolymers etc. and the like, and further, it is also possible to appropriately add a silane coupling agent etc. Among these additives, by adding the polymeric aqueous emulsion in an amount of 5-1000 parts by weight, preferably 10-900 parts by weight, per 100 parts by weight of the modified PVA, the adhesion can sometimes be improved.

The defogging composition of this invention may be dissolved or dispersed in water or water containing the aforesaid organic solvents, and applied to various transparent materials preferably as an aqueous dispersion, and this is generally used by coating the aforesaid aqueous dispersion on a transparent material. The transparent material to which the defogging composition of this invention may be applied is not particularly restricted, and for example inorganic glass, plastics, metals etc. may be mentioned; more specifically, this is preferrably applied to window glass of automobiles, trains, buildings etc., spectacle lenses, mirrors for e.g. bathrooms, plastic films for agricultural houses, plastic films for window glass, etc.

As the method for applying the defogging composition of this invention to a transparent material, it is possible to employ various conventional methods known in the art, for example, brush ooating, dip coating, spin coating, flow coating, spray coating, roll coating, air knife coating, blade coating etc.

While the defogging composition of this invention may be coated on a transparent material by the above-described methods, by appropriately subjecting to acid treatment or heat treatment, a film having even longer lasting defogging properties and high water resistance (e.g. surface hardness when water absorbed) may be obtained.

Although the film obtained using the defogging composition of this invention is satisfactorily practical as such, it is also effective to subject the formed film to post-treatment, for example, coating, impregnation etc. of various hydrophilic substances, surface active agents etc., in order to make said. effect even further remarkable.

Further, for the purpose of improving the adhesion between the transparent material and the defogging composition of this invention, it is also effective to subject the surface of the transparent material to pre-treatment, for example, coating treatment of various primers or adhesives, activated gas treatment, chemical treatment with acid, alkali etc., and the like.

The defogging composition of this invention is characterized by having long-lasting defogging properties, high water resistance (e.g. surface hardness when water absorbed) and remarkably excellent scratch resistance. Although the reasons why the defogging composition of this invention has the significantly excellent performance as described above have not yet been fully understood, it is presumed that the defogging properties are manifested by the hydrophilic properties owing to the hydroxyl group in the modified PVA having a silyl group in the molecule used in the defogging composition of this invention and at the same time since the silyl group to which the alkoxyl group or the acyloxyl group is attached or the silanol group which is a hydrolysate of the above or the salt group thereof has high reactivity with the inorganic substance or the hydroxyl group or the silanol group or the salt group thereof in the modified PVA and hence they react with each other to form a firm film, thereby high surface hardness even when water absorbed and high scratch resistance are manifested. In particular, where the transparent material to which the defogging composition of this invention is applied is inorganic glass, the adhesion of the film to the glass is remarkably increased due to a strong interaction between the silyl group in the aforesaid modified PVA and the glass, thus especially effective.

This invention is more particularly described by the following examples, but it should be noted that this invention is not restricted thereto. In the examples, the "%" and "parts" are by weight unless otherwise stated.

EXAMPLE 1

A copolymer of vinyltrimethoxysilane and vinyl acetate was saponified to obtain a modified PVA having a silyl group in the molecule containing 0.5 molar % of the silyl groups as vinylsilane units and having a degree of saponification of the vinyl acetate units of 99.2 molar % and a degree of polymerization thereof of 1600. This modified PVA was dissolved in water containing 2.5% based on said modified PVA of sodium hydroxide to prepare a 10% modified PVA aqueous solution. Thirty parts of a clay slurry of a particle diameter of ca. $0.5\mu$ dispersed in water to a solids content of 30% was mixed with 100 parts of this aqueous solution, and the obtained aqueous dispersion was cast to prepare a sheet-formed product. The obtained sheet-formed product was insoluble in both cold water and hot water (95° C.).

COMPARATIVE EXAMPLE 1

A sheet-formed product was obtained by procedures similar to those in Example 1 except that the modified PVA used in Example 1 was replaced by PVA having a degree of polymerization of 1750 and a degree of saponification of 98.5 molar %. When this sheet-formed product was dipped in water, it came apart and become dispersed again.

EXAMPLES 2–4

Procedures similar to those in Example 1 were conducted except that the clay used in Example 1 was replaced by the inorganic substances given below. The obtained sheet-formed products were insoluble in both cold water and hot water (95° C.).

Inorganic substance used in

Example 2: White carbon (silicon dioxide) of a particle diameter of ca. 20 m$\mu$, Example 3: Calcium carbonate of a particle diameter of ca. 50 m$\mu$, Example 4: Calcium silicate of a particle diameter of ca. 50 m$\mu$.

EXAMPLE 5

A copolymer of 3-methacrylamidopropyltriethoxysilane and vinyl acetate was saponified to obtain a modified PVA containing 0.25 molar % of the silyl groups and having a degree of saponification of the vinyl acetate units of 98.5 molar % and a degree of polymerization thereof of 1750. Using this modified PVA, procedures similar to those in Example 1 were conducted, and the thus obtained sheet-formed product was insoluble in both cold water and hot water (95° C.).

EXAMPLE 6

A copolymer of vinyltriisopropoxysilane and vinyl acetate was saponified to obtain a silyl group-containing modified PVA containing 0.3 molar % of the silyl groups and having a degree of saponification of the vinyl acetate units of 88 molar % and a degree of polymerization thereof of 1750. This modified PVA was dissolved in water to prepare a 10% modified PVA aqueous solution. Twenty parts of colloidal silica (produced by Nissan Chemicals Industries, Ltd.; Snowtex O; particle diameter 10–20 mμ; solids content 20%; acidic type) and 20 parts of water were added to 60 parts of the above aqueous solution to prepare a slurry. The obtained slurry was cast on a mortar to a dry solids dosage of 30 g/m$^2$, and dried at room temperature for 3 days to form a film. A funnel connected with a glass tube was bonded on this film, and while supplying water to the glass tube so that the water level be always maintained at 1 m, the amount of water permeated into the film was measured. The amount of water permeated in 15 days was 5 ml/m$^2$.

EXAMPLE 7

A copolymer of vinyltrimethoxysilane and vinyl acetate was saponified to obtain a modified PVA containing 0.4 molar % of the silyl groups as vinylsilane units and having a degree of saponification of the vinyl acetate units of 98.5 molar % and a degree of polymerization thereof of 1750. Four parts of a 10% aluminum sulfate aqueous solution was mixed with 100 parts of a 4% aqueous solution of this modified PVA, and this was cast on a mortar plate to a dry solids dosage of 30 g/m$^2$, and dried at room temperature for 3 days to form a film. A funnel connected with a glass tube was bonded on the film, and the amount of water permeated was measured in a manner similar to that in Example 6. The amount of water permeated in 15 days was 20 ml/m$^2$.

COMPARATIVE EXAMPLE 2

The amount of water permeated was measured on the mortar plate as such used in Example 6 in a manner similar to that in Example 6 to obtain 5000 ml/m$^2$.

COMPARATIVE EXAMPLE 3

Procedures similar to those in Example 7 were conducted except that the 4% aqueous solution of the modified PVA was used without adding the aluminum sulfate. The amount of water permeated was 500 ml/m$^2$.

COMPARATIVE EXAMPLE 4

Procedures similar to those in Example 6 were conducted except that the silyl group-containing modified PVA used in Example 6 was replaced by PVA having a degree of polymerization of 1750 and a degree of saponification of 98.5 molar %. The amount of water permeated was 5000 ml/m$^2$.

EXAMPLE 8

Forty parts of a slurry of white carbon of a particle diameter of ca. 0.5μ dispersed in water was added to 100 parts of a 10% aqueous solution of the modified PVA obtained in Example 1 to prepare an aqueous dispersion having a solids content of 10%. This aqueous dispersion was coated on a mortar plate having a surface pH of 12 to a dry solids dosage of 50 g/m$^2$, and, after placing a cotton cloth thereon as a reinforcing material, dried at room temperature for 2 days. Thereafter, the film on the mortar plate was given a cut with a width of 1 cm using a knife, then dipped in water either at room temperature or at 40° C. for 3 days, and the water-resistant adhesive power was measured at a peeling angle of 90° and a pulling speed of 500 mm/min. using an autograph (Model IM-100 manufactured by Shimazu Seisakusho Ltd.) to obtain the results shown in Table 1.

COMPARATIVE EXAMPLE 5

Procedures similar to those in Example 8 were conducted except that the 10% aqueous solution of the modified PVA used in Example 8 was used without adding the white carbon. The results are also shown in Table 1.

COMPARATIVE EXAMPLE 6

Procedures similar to those in Example 8 were conducted except that the modified PVA used in Example 8 was replaced by a conventional unmodified PVA having a degree of polymerization of 1750 and a degree of saponification of 98.5 molar %. The results are also shown in Table 1.

TABLE 1

| | Water-Resistant Adhesive Power (kg/cm) | |
|---|---|---|
| | After Dipping in Water at R.T. | After Dipping in Water at 40° C. |
| Example 8 | 4.1 | 3.5 |
| Comparative Example 5 | 2.0 | 1.0 |
| Comparative Example 6 | 0.6 | Spontaneously peeled off |

It can be seen from Table 1 that the water-resistant composition of this invention is remarkably excellent in water resistance also under alkaline conditions.

EXAMPLE 9

A copolymer of vinyltrimethoxysilane and vinyl acetate was saponified to obtain a modified PVA having a silyl group in the molecule containing 1.0 molar % of the silyl groups as vinylsilane units and having a degree of saponification of the vinyl acetate units of 98.5 molar % and a degree of polymerization thereof of 1500. This modified PVA was dissolved in water containing 2.5% based on said modified PVA of sodium hydroxide to prepare a 2% modified PVA aqueous solution. Five parts of a 10% aqueous solution of sodium silicate was added to 100 parts of this solution to obtain a water-resistant composition of this invention. This aqueous composition was sprayed over sandy soil to a dry solids dosage of 30 g/m$^2$, air dried for 3 days, then a glass tube of 1 m in height was bonded vertically on its surface, and while supplying water to the glass tube so as to maintain the water level at 1 m, the water leakage into the sandy soil was measured. The amount of water leaked in 15 days was 15 ml/m$^2$. For reference, where no sodium silicate was employed or where the PVA obtained in Comparative Example 4 was employed instead of the aforesaid modified PVA, water leakage was instantaneous and extremely large in either case and thus measurement was impossible.

EXAMPLE 10

One hundred parts of a 10% aqueous solution of sodium silicate was mixed with 100 parts of a 10% aqueous solution of the modified PVA used in Example 9 to obtain an aqueous solution composition of this invention. When 50 parts of this aqueous solution was mixed with 100 parts of sand of a particle diameter of ca. 50μ, the sand solidified in 30 seconds after mixing. This solidified product was immediately cut into cylinders of 5 cm in diameter and 10 cm in height, and the compressive breaking strength was measured to obtain 3.5 kg/cm$^2$. For reference, in the above composition, where no sodium silicate was used or where said modified PVA was not used, the solidifying time was 2 days and 5 hours respectively and the compressive breaking strength was 0.8 kg/cm² and 2.0 kg/cm² respectively.

It can be seen from the above results that the composition of this invention rapidly solidified sand and even under wet conditions gives a solidified product having high breaking strength. Thus, the composition of this invention is useful as a treating agent for solidifying soil.

EXAMPLE 11

A modified PVA which had been obtained by saponifying a copolymer of vinyltrimethoxysilane and vinyl acetate and which contained 0.5 molar % of the silyl groups as vinylsilane units and had a degree of saponification of the vinyl acetate units of 99.0 molar % and a degree of polymerization thereof of 700 was dissolved in water to prepare a 10% modified PVA aqueous solution. Fifty parts of colloidal silica (produced by Nissan Chemicals Industries, Ltd.; Snowtex O; particle diameter 10–20 mμ; solids content 20%) was added to 100 parts of this aqueous solution to obtain an aqueous dispersion of a defogging composition of this invention. This aqueous dispersion was coated on a glass plate using a bar coater to a dry thickness of 5μ, dried at 105° C. for 10 minutes, then dipped in a ½N sulfuric acid bath followed by washing with water, and heat treated at 150° C. for one minute. Using the obtained specimen, the defogging properties, the adhesion to glass and the surface hardness were measured. The results are shown in Table 2. It can be seen from Table 2 that the defogging composition of this invention is remarkably excellent in continuous defogging properties, adhesion and surface hardness when water absorbed.

COMPARATIVE EXAMPLE 7

In lieu of the aqueous dispersion in Example 11, a commercially available low-molecular surface active agent-based defogging composition was sprayed on a glass plate by a spray method, and the defogging properties were measured in a manner similar to that in Example 11. The results are also shown in Table 2.

COMPARATIVE EXAMPLE 8

In lieu of the aqueous dispersion in Example 11, 100 parts of a 20% aqueous solution of a conventional partially saponified PVA (degree of polymerization 600, degree of saponification 88 molar %) was mixed with 100 parts of colloidal silica (produced by Nissan Chemicals Industries, Ltd., Snowtex-O, solids content 20%) and 4 parts of vinyltris(β-methoxyethoxy)silane, and heated at 80° C. for an hour to obtain a composition, which was then coated similarly as in Example 11, and the obtained film was heat treated at 150° C. for 3 minutes, and measured for the defogging properties, the adhesion and the surface hardness in a manner similar to that in Example 11. The results are also shown in Table 2.

COMPARATIVE EXAMPLE 9

In lieu of the aqueous dispersion in Example 11, a methanol solution of a 2-hydroxyethyl methacrylate compolymer copolymerized with 5 molar % of glycidyl methacrylate was used and coated on a glass plate similarly as in Example 11, and the obtained film was heat treated at 120° C. for 30 minutes, and then measured for the defogging properties, the adhesion, and the surface hardness in a manner similar to that in Example 11. The results are also shown in Table 2.

TABLE 2

|  |  | Adhesion[2] | | | Surface Hardness[3] | |
| --- | --- | --- | --- | --- | --- | --- |
|  | Defogging Properties[1] | Normal Conditions | After Dipping in Water at 20° C. | After Dipping in Water at 80° C. | Normal Conditions | After Dipping in Water at 20° C. |
| Example 11 | Transparent until 10 times | 100 | 100 | 100 | 7H | 4H |
| Comparative Example 7 | Cloudiness occured at the 2nd time | — | — | — | — | — |
| Comparative Example 8 | Transparent until 10 times | 100 | 50 | Film hardly soluble | 5H | 6B |
| Comparative Example 9 | Transparent until 10 times | " | 100 | 50 | 4H | B |

Notes:
[1]Defogging Properties: In a room at 20° C., the specimen was placed on a container generating saturated steam of 40° C. for 10 seconds to apply the saturated steam, and dried; this procedure was repeated 10 times, and the value is expressed as the number of the times until cloudiness occured within 10 seconds.
[2]Adhesion: The specimen surface was given cuts reaching to the glass, eleven cuts lengthwise and eleven cuts breadthwise one mm apart respectively, using a knife to make 100 small squares of 1 mm × 1 mm in a checkerboard form, then, either directly (normal conditions) or after dipping in water at 20° C. for 12 hours or in hot water at 80° C. for an hour and wiping off the surface water, a cellophane adhesive tape was applied thereto and instantaneously peeled off. The value is expressed as the number of the squares remaining.
[3]Surface Hardness: The specimen surface was, either directly (normal conditions) or after dipping in water at 20° C. for 12 hours, scratched using pencil leads of various hardnesses, and the value is expressed as the highest hardness causing no scratch.

EXAMPLES 12–18

Procedures similar to those in Example 11 were conducted except that the modified PVA aqueous solution was replaced by the modified PVA aqueous solutions shown below. The results are shown in Table 3.

Modified PVA aqueous solution used in Example 12: A 10% aqueous solution obtained by dissolving in water a modified PVA obtained by saponifying a copolymer of vinyltriethoxysilane and vinyl acetate, containing 0.5 molar % of the silyl groups as vinylsilane units and having a degree of saponification of the vinyl acetate units of 98.5 molar % and a degree of polymerization thereof of 700.

Modified PVA aqueous solution used in Example 13: A 10% aqueous solution obtained by dissolving in water a modified PVA obtained by saponifying a copolymer of 3-methacrylamidopropyltrimethoxysilane and vinyl acetate, containing 0.15 molar % of the silyl groups as methacrylamidosilane units and having a degree of saponification of the vinyl acetate units of 88 molar % and a degree of polymerization thereof of 2000.

Modified PVA aqueous solution used in Example 14: A 10% aqueous solution obtained by dissolving in water a modified PVA obtained by saponifying a copolymer of vinyltriacetoxysilane and vinyl acetate, containing 0.20 molar % of the silyl groups as vinylsilane units and having a degree of saponification of the vinyl acetate units of 98.5 molar % and a degree of polymerization thereof of 1750.

Modified PVA aqueous solution used in Example 15:

then, after drying, a ½N acetic acid aqueous solution was sprayed, and further heat treated at 150° C. for 3 minutes to prepare a specimen. Using this specimen, the performance was measured in a manner similar to that in Example 11. The results are also shown in Table 3.

TABLE 3

|  | Defogging Properties | Adhesion | | | Surface Hardness | |
|---|---|---|---|---|---|---|
|  |  | Normal Conditions | After Dipping in Water at 20° C. | After Dipping in Water at 80° C. | Normal Conditions | After Dipping in Water at 20° C. |
| Example 12 | Transparent until 10 times | 100 | 100 | 100 | 7H | 4H |
| Example 13 | " | " | " | " | " | H |
| Example 14 | " | " | " | " | " | 2H |
| Example 15 | " | " | " | " | " | 2H |
| Example 16 | " | " | " | " | " | 2H |
| Example 17 | " | " | " | " | " | H |
| Example 18 | " | " | " | " | " | 3H |
| Example 19 | " | " | " | " | " | 2H |

A 10% aqueous solution obtained by dissolving in water a modified PVA obtained by saponifying a copolymer of vinyltriisopropoxysilane and vinyl acetate, containing 0.25 molar % of the silyl groups as vinylsilane units and having a degree of saponification of the vinyl acetate units of 89.0 molar % and a degree of polymerization thereof of 1750.

Modified PVA aqueous solution used in Example 16:
A 10% aqueous solution obtained by dissolving in water a modified PVA obtained by saponifying a copolymer of dimethyl-3-methacrylamido-propyl-3-trimethoxysilylpropylammonium chloride and vinyl acetate, containing 0.2 molar % of the silyl groups and having a degree of saponification of the vinyl acetate units of 98.5 molar % and a degree of polymerization thereof of 1750.

Modified PVA aqueous solution used in Example 17:
A 20% aqueous solution obtained by dissolving in water a modified PVA obtained by saponifying a modified polyvinyl acetate containing a silyl group at a terminal obtained by, on the radical polymerization of vinyl acetate in methanol, continuously adding 3-(trimethoxysilyl)-propylmercaptan to the polymerization system, said modified PVA containing 1 molar % of the silyl groups as propylmercaptan units and having a degree of saponification of the vinyl acetate units of 99.0 molar % and a degree of polymerization thereof of 100.

Modified PVA aqueous solution used in Example 18:
A 20% aqueous solution of a modified PVA obtained in a manner similar to that in Example 17, containing 4 molar % of the silyl groups as propylmercaptan units and having a degree of saponification of the vinyl acetate units of 98.6 molar % and a degree of polymerization of 25.

EXAMPLE 19

A composition composed of 100 parts of the 2% modified PVA used in Example 13 and 50 parts of Snowtex-O was coated on a glass plate using a sprayer,

EXAMPLES 20–23

Procedures similar to those in Example 11 were conducted except that the colloidal silica used in Example 11 was used in the amounts shown below instead of the 50 parts as in Example 11. The results are shown in Table 4.

Example 20: 5 Parts of Snowtex-O
Example 21: 10 Parts of Snowtex-O
Example 22: 25 Parts of Snowtex-O
Example 23: 50 Parts of Snowtex-O

EXAMPLE 24

Procedures similar to those in Example 11 were conducted except that the glass plate used in Example 11 was replaced by a polyester film previously coated with a urethane type resin (Toyo Morton Co., Ltd.; mixture of 100 parts of "Adcoat 1030" and 17 parts of "CAT-10") to a thickness of 1μ. The results are also shown in Table 4.

TABLE 4

|  | Defogging Properties | Adhesion | | | Surface Hardness | |
|---|---|---|---|---|---|---|
|  |  | Normal Conditions | After Dipping in Water at 20° C. | After Dipping in Water at 80° C. | Normal Conditions | After Dipping in Water at 20° C. |
| Example 20 | Transparent until 10 times | 100 | 100 | 100 | 5H | H |
| Example 21 | " | " | " | " | 5H | H |
| Example 22 | " | " | " | " | 6H | 2H |
| Example 23 | " | " | " | " | 7H | 5H |
| Example 24 | " | " | " | " | " | 4H |

What is claimed is:
1. A composition which comprises a modified polyvinyl alcohol, having a silyl group in the molecule, and an inorganic substance selected from those containing aluminum, silica and magnesium; wherein the silyl group in the molecule is a silyl group of the formula (I)

wherein
m=0–2 and p=1–3, with the proviso that $m+p \leq 3$;
M is a hydrogen atom or an alkali metal;
$R^1$ is ($C_1$–$C_5$) alkyl; and $R^2$ is $(C_1-C_{40})$ alkoxyl, $(C_1-C_{40})$ acyloxyl, or $(C_1-C_{40})$ alkoxyl or $(C_1-C_{40})$ acyloxyl having a substituent containing oxygen; wherein the mixing ratio by weight of the modified polyvinyl alcohol having a silyl group in the molecule to the inorganic substance is in the range of about 5/95 to 99/1; wherein the modified polyvinyl alcohol contains about 0.01–10 molar % of monomer unit containing a silyl group in the molecule.

2. The composition according to claim 1 wherein the modified polyvinyl alcohol is a saponified product of a copolymer of a vinyl ester and an olefinically unsaturated monomer having a silyl group in the molecule.

3. The composition according to claim 2 wherein the olefinically unsaturated monomer having a silyl group in the molecule is a vinylsilane of the formula (II):

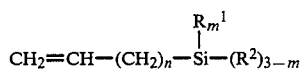  (II)

wherein
n is 0–4,
m is 0–2,
$R^1$ is an alkyl group of 1–4 carbon atoms, and
$R^2$ is an alkoxyl group or acyloxyl group of 1–40 carbon atoms or an alkoxyl group or acyloxyl group having a substituent group containing oxygen.

4. The composition according to claim 2 wherein the olefinically unsaturated monomer having a silyl group in the molecule is a monomer of the formula (III):

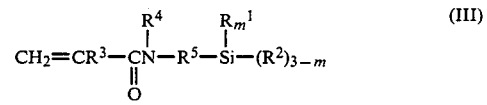  (III)

wherein
m is 0–2,
$R^1$ is an alkyl group of 1–5 carbon atoms,
$R^2$ is an alkoxyl group or acyloxyl group of 1–40 carbon atoms,
or an alkoxyl group or acyloxyl group having a substituent group containing oxygen,
$R^3$ is a hydrogen atom or a methyl group,
$R^4$ is a hydrogen atom or an alkyl group of 1–5 carbon atoms, and
$R^5$ is an alkylene group of 1–5 carbon atoms or a divalent organic residue in which the carbon atoms in the chain are connected with each other via oxygen or nitrogen.

5. The composition according to claim 1 wherein the modified polyvinyl alcohol having a silyl group in the molecule is a saponified product of a polyvinyl ester having a silyl group at a terminal obtained by polymerizing a vinyl ester in the presence of a mercaptan having a silyl group.

6. The composition according to claim 1 wherein the inorganic substance is finely divided particles of an average particle diameter of not greater than 200 m$\mu$.

7. The composition according to claim 6 wherein the inorganic substance is finely divided particles of an average particle diameter of not greater than 100 m$\mu$.

8. The composition according to claim 1 wherein the inorganic substance is colloidal silica.

* * * * *